(12) United States Patent
Oota et al.

(10) Patent No.: US 12,392,406 B2
(45) Date of Patent: Aug. 19, 2025

(54) UNIT

(71) Applicant: JATCO Ltd, Fuji (JP)

(72) Inventors: Yusuke Oota, Ebina (JP); Kazuhiko Yokoyama, Fuji (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 18/566,742

(22) PCT Filed: May 26, 2022

(86) PCT No.: PCT/JP2022/021495
§ 371 (c)(1),
(2) Date: Dec. 4, 2023

(87) PCT Pub. No.: WO2022/270213
PCT Pub. Date: Dec. 29, 2022

(65) Prior Publication Data
US 2024/0271691 A1  Aug. 15, 2024

(30) Foreign Application Priority Data
Jun. 24, 2021 (JP) ................. 2021-105241

(51) Int. Cl.
*F16H 57/04* (2010.01)
*F16H 48/38* (2012.01)

(52) U.S. Cl.
CPC ......... *F16H 57/0412* (2013.01); *F16H 48/38* (2013.01)

(58) Field of Classification Search
CPC .............................. F16H 57/0412; F16H 48/38
See application file for complete search history.

(56) References Cited

U.S. PATENT DOCUMENTS

| | | | | |
|---|---|---|---|---|
| 2,053,929 A | * | 9/1936 | Wiedmaier | F16H 3/64 184/11.1 |
| 5,197,929 A | * | 3/1993 | Scheiber | F16D 65/853 475/160 |
| 5,540,300 A | * | 7/1996 | Downs | F16H 57/0457 184/104.1 |
| 5,931,218 A | * | 8/1999 | Carlson | F28D 7/005 165/47 |
| 6,432,018 B1 | * | 8/2002 | Morse | F16H 57/037 475/161 |
| 6,830,096 B1 | * | 12/2004 | Fett | F16H 57/0412 165/47 |
| 10,125,644 B2 | * | 11/2018 | Palanchon | F01M 5/001 |
| 2018/0149261 A1 | * | 5/2018 | Creech | F16H 57/0435 |
| 2019/0162291 A1 | | 5/2019 | Gerges et al. | |

FOREIGN PATENT DOCUMENTS

| | | | | |
|---|---|---|---|---|
| JP | 2516687 Y2 | * | 11/1996 | ........ F16H 57/0417 |
| JP | 2004-278345 A | | 10/2004 | |
| JP | 2008-185078 A | | 8/2008 | |
| JP | 2012-237358 A | | 12/2012 | |

* cited by examiner

*Primary Examiner* — Thomas C Diaz
(74) *Attorney, Agent, or Firm* — Foley & Lardner LLP

(57) ABSTRACT

Provided is a unit including: a housing configured to accommodate a differential gear mechanism, in which the housing has a flow path through which a coolant flows, the flow path has a portion that overlaps the differential gear mechanism when viewed in a radial direction, and the flow path has a portion that is positioned above a horizontal plane passing through an axis of an output shaft of the differential gear mechanism and orthogonal to a gravity direction.

7 Claims, 10 Drawing Sheets

UNIT

TECHNICAL FIELD

The present invention relates to a unit.

BACKGROUND ART

Patent Document 1 discloses a unit including a motor and a power transmission mechanism.

PRIOR ART DOCUMENT

Patent Document

Patent Document 1: JP 2008-185078 A

SUMMARY OF INVENTION

The unit includes a housing which accommodates the motor and the power transmission. The temperature of the housing rises as the components constituting the motor and the power transmission rotate and generate heat. Provided is a flow path through which a coolant being cooling water or the like flows. The temperature rise of the housing is reduced by heat exchange with the coolant.

It is required to improve the heat exchange efficiency between the housing and the coolant.

A unit according to an aspect of the present invention is a unit including:
- a housing configured to accommodate a differential gear mechanism, in which
- the housing has a flow path through which a coolant flows,
- the flow path has a portion that overlaps the differential gear mechanism when viewed in a radial direction, and
- the flow path has a portion that is positioned above a horizontal plane passing through an axis of an output shaft of the differential gear mechanism and orthogonal to a gravity direction.

According to an aspect of the present invention, the heat exchange efficiency between the housing and the coolant can be improved.

DESCRIPTION OF EMBODIMENTS

Figure 1:
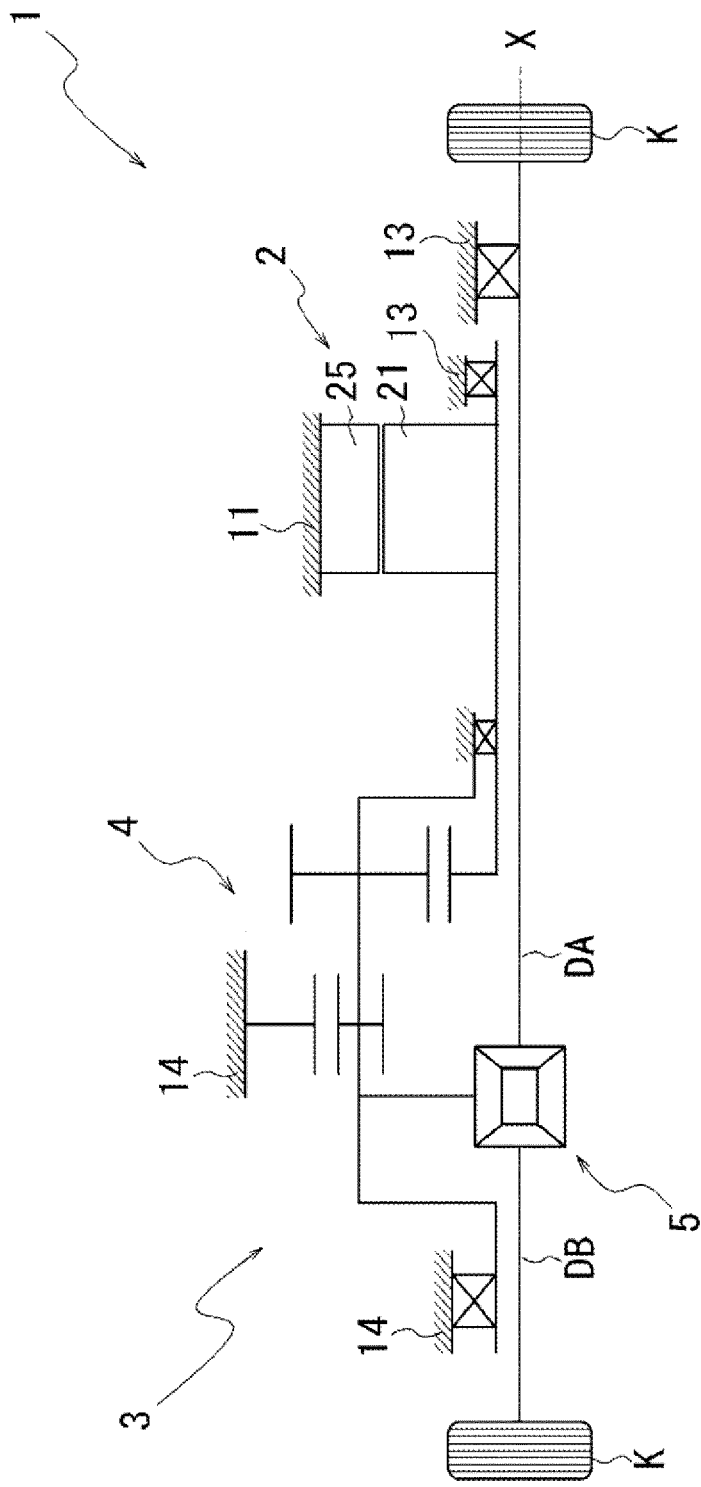
FIG. 1 is a skeleton diagram illustrating a unit mounted on a vehicle.

First, definitions of terms in the present specification will be described.

A "unit" is also referred to as a "motor unit", a "power transmission device", or the like. The motor unit is a unit that includes at least a motor. The power transmission device is a device that includes at least a power transmission mechanism, and is, for example, a gear mechanism and/or a differential gear mechanism. A unit that is a device including a motor and a power transmission mechanism belongs to the concept of both the motor unit and the power transmission device.

A "housing" accommodates a motor, a gear, and an inverter. The housing includes one or more cases.

"3-in-1" means a form in which a part of a motor case accommodating a motor and a part of an inverter case accommodating an inverter are integrally formed. For example, when a cover and a case constitute one case, in "3-in-1", the case accommodating a motor and the case accommodating an inverter are integrally formed.

A "motor" is a rotating electrical machine that has a motor function and/or a generator function.

When referring to a second element (component, portion, or the like) connected to a first element (component, portion, or the like), the second element (component, portion, or the like) connected downstream of the first element (component, portion, or the like), and the second element (component, portion, or the like) connected upstream of the first element (component, portion, or the like), it means that the first element and the second element are connected such that power can be transmitted. A power input side is upstream, and a power output side is downstream. The first element and the second element may be connected to each other via another element (clutch, other gear mechanism, or the like).

The description "overlap when viewed in a predetermined direction" means that a plurality of elements are disposed in a predetermined direction, and has the same meaning as the description "overlap in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are disposed in a predetermined direction, in the description of the specification, it may be considered that there is a sentence explaining that the plurality of elements overlap when viewed in the predetermined direction.

The descriptions "do not overlap when viewed in a predetermined direction" and "are offset when viewed in a predetermined direction" mean that a plurality of elements are not disposed in a predetermined direction, and have the same meaning as the descriptions "do not overlap in a predetermined direction" and "are offset in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are not disposed in a predetermined direction, in the description of the specification, it may be considered that there is a sentence explaining that the plurality of elements do not overlap when viewed in the predetermined direction.

The description "a first element (component, portion, or the like) is positioned between a second element (component, portion, or the like) and a third element (component, portion, or the like) when viewed in a predetermined direction" means that when viewed from the predetermined direction, it can be observed that the first element is between the second element and the third element. The "predetermined direction" is an axial direction, a radial direction, a gravity direction, a vehicle traveling direction (vehicle forward direction, vehicle backward direction), or the like.

For example, when the second element, the first element, and the third element are disposed in this order along the axial direction, it can be said that the first element is positioned between the second element and the third element when viewed in the radial direction. When the drawing shows that the first element is positioned between the second element and the third element when viewed in a predetermined direction, in the description of the specification, it may be considered that there is a sentence explaining that the first element is between the second element and the third element when viewed in the predetermined direction.

In a case where two elements (components, portions, or the like) overlap when viewed in the axial direction, the two elements are coaxial.

The "axial direction" means an axial direction of a rotation axis of a component that constitutes a unit. The "radial direction" means a direction orthogonal to the rotation axis of the component that constitutes a unit. Examples of components include a motor, a gear mechanism, and a differential gear mechanism.

When a rotating element (for example, sun gear, carrier, or ring gear) of a planetary gear mechanism is "fixed" to another element, the rotating element may be directly fixed or may be fixed via another member.

A "downstream side in a rotation direction" means a downstream side in a rotation direction when a vehicle moves forward or in a rotation direction when the vehicle moves backward. It is preferable to regard it as the downstream side in the rotation direction when the vehicle moves forward, which occurs frequently. A downstream side in a rotation direction of the planetary gear mechanism means a downstream side in a revolution direction of a pinion gear.

A "catch tank" is an element (component, portion, or the like) that has a function of a tank (container) into which oil is introduced. The supply of oil from the outside of the tank to the tank is expressed as "catch". The catch tank is provided, for example, using at least a part of the housing, or is provided separately from the housing. The integrated formation of the catch tank and the housing contributes to a reduction in the number of components.

A "coolant" is a refrigerant and is a type of heat exchange medium. For example, the "coolant" is a liquid (cooling water or the like) or a gas (air or the like). The coolant is a concept that includes oil, but when both oil and coolant are described in the present specification, it means that the coolant is made of a material different from that of the oil.

A "heat exchange unit" is an element (component, portion, or the like) that exchanges heat between two different heat exchange media. Combinations of the two heat exchange media are, for example, oil and cooling water, cooling water and air, or air and oil. The heat exchange unit includes, for example, a heat exchanger (oil cooler), a flow path through which a coolant flows, and a heat pipe. In the present invention, it is preferable to use, for example, a flow path, through which the coolant flows, formed in the housing as the heat exchange unit. This can contribute to a reduction in dimension of the unit.

The "flow path, through which the coolant flows, formed in the housing" is a portion integrally formed with the housing. For example, heat is exchanged between the coolant and the oil and/or air in the housing via a wall portion of the housing.

A "vehicle room" means a room in a vehicle into which occupants enter.

Hereinafter, an embodiment of the present invention will be described.

FIG. 1 is a skeleton diagram illustrating a unit mounted on a vehicle.

Figure 2:
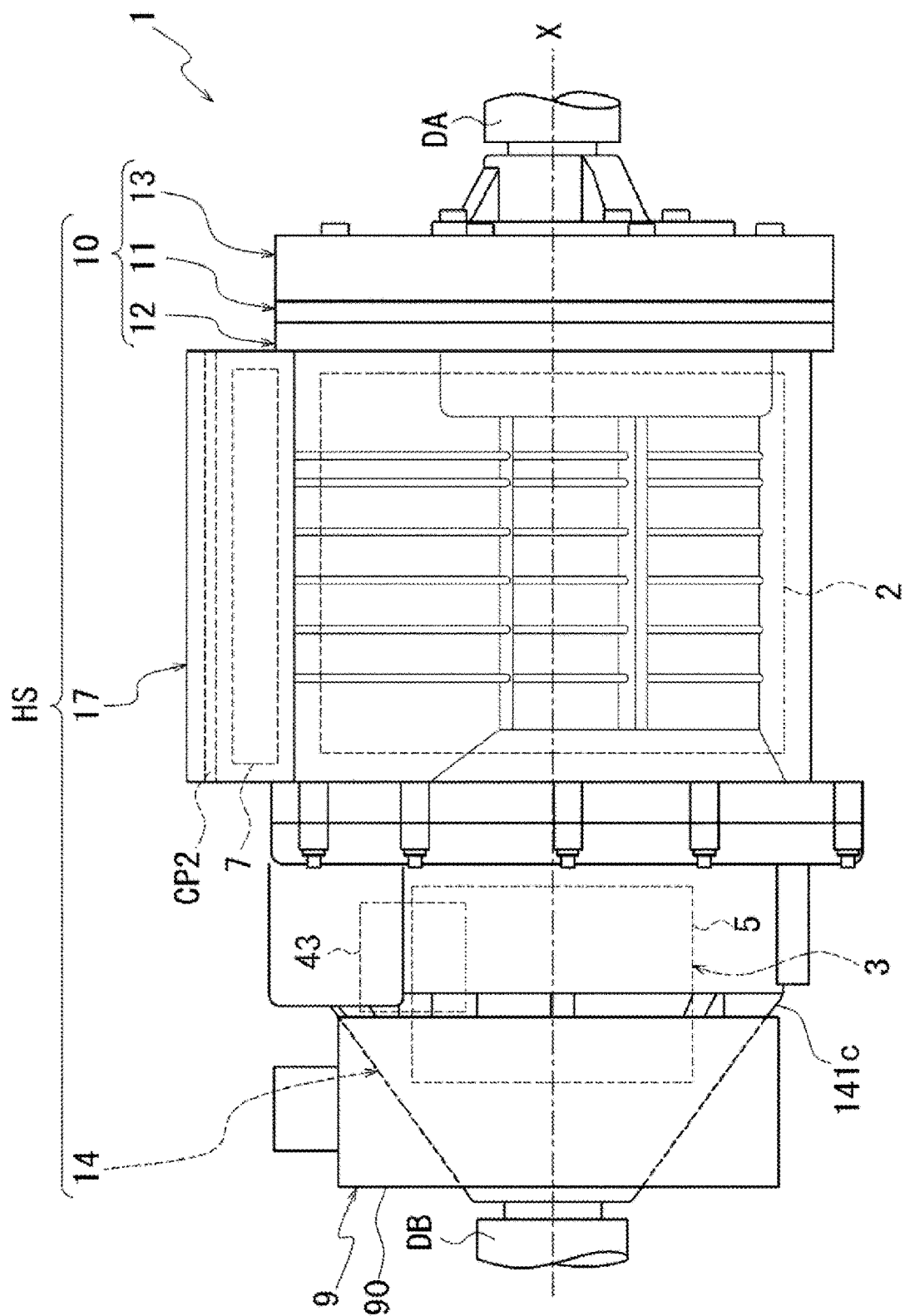
FIG. 2 is an external view of the unit.

FIG. 2 is an external view of the unit.

Figure 3:
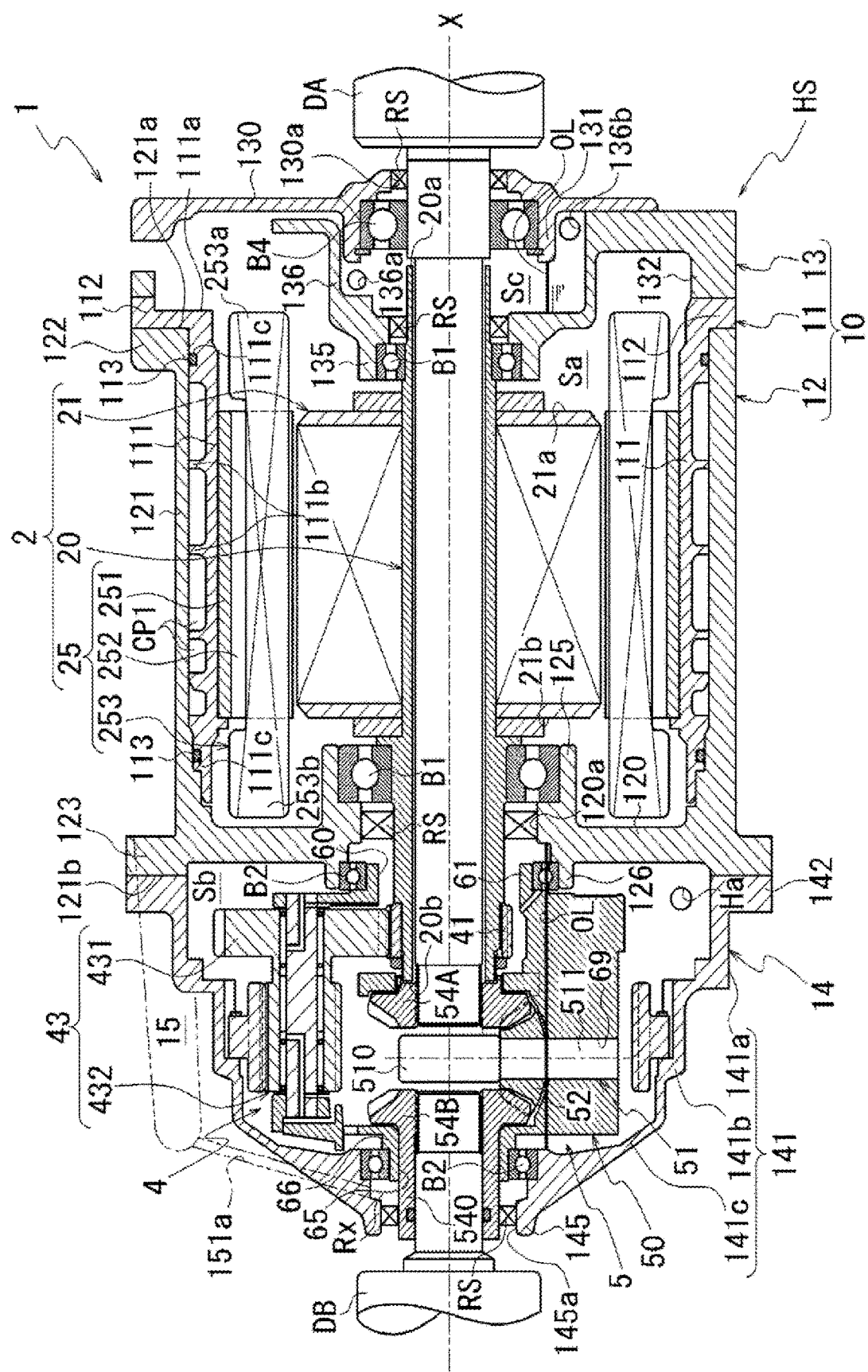
FIG. 3 is a schematic cross-sectional view of the unit.

FIG. 3 is a schematic cross-sectional view of the unit. FIG. 3 shows a state in which an inverter case is removed.

Figure 4:
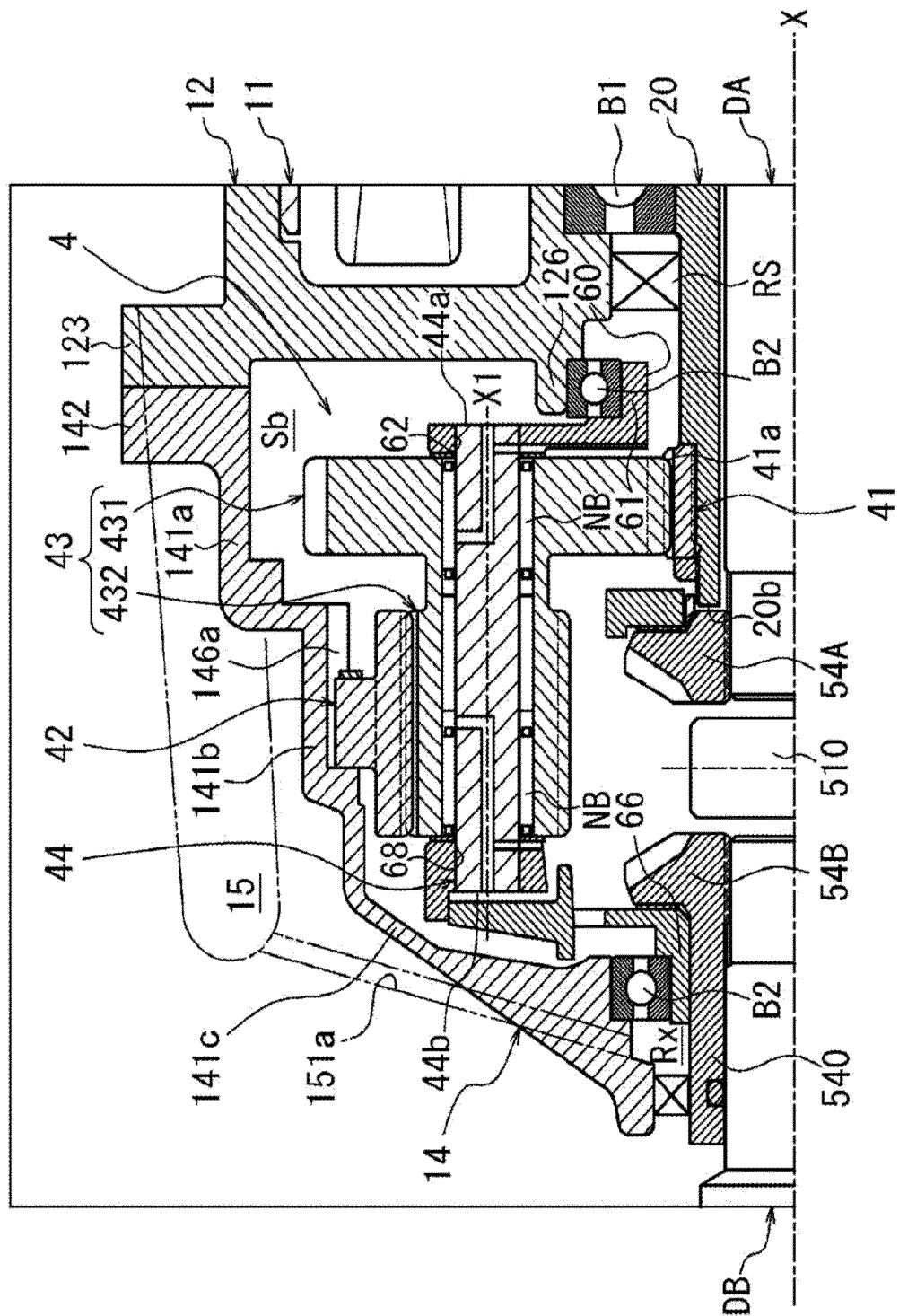
FIG. 4 is an enlarged view around a planetary reduction gear.

FIG. 4 is an enlarged view around a planetary reduction gear.

Figure 5:
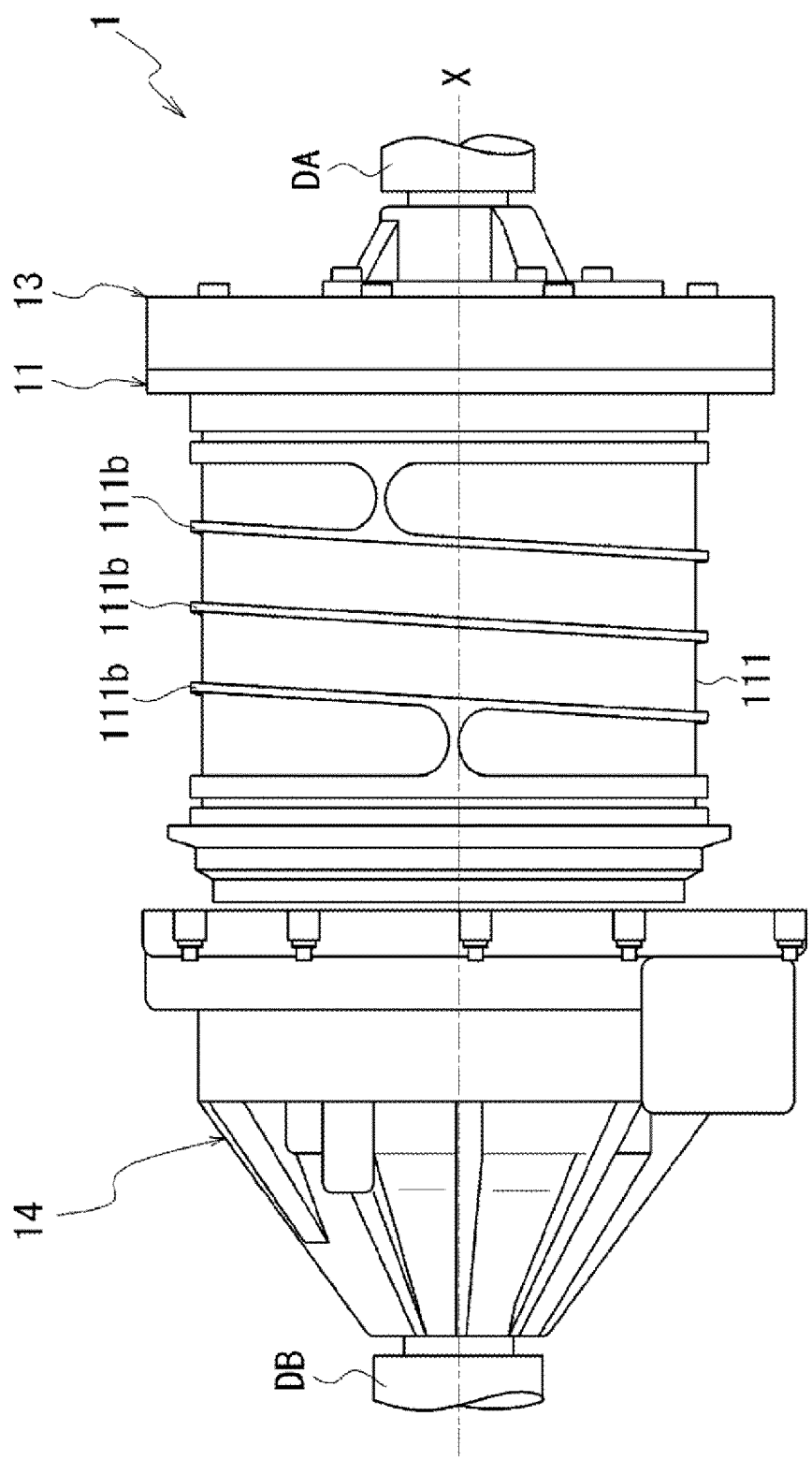
FIG. 5 is a top view of a motor case with a second case member removed.

FIG. 5 is a top view of a motor case with a second case member removed.

Figure 6:
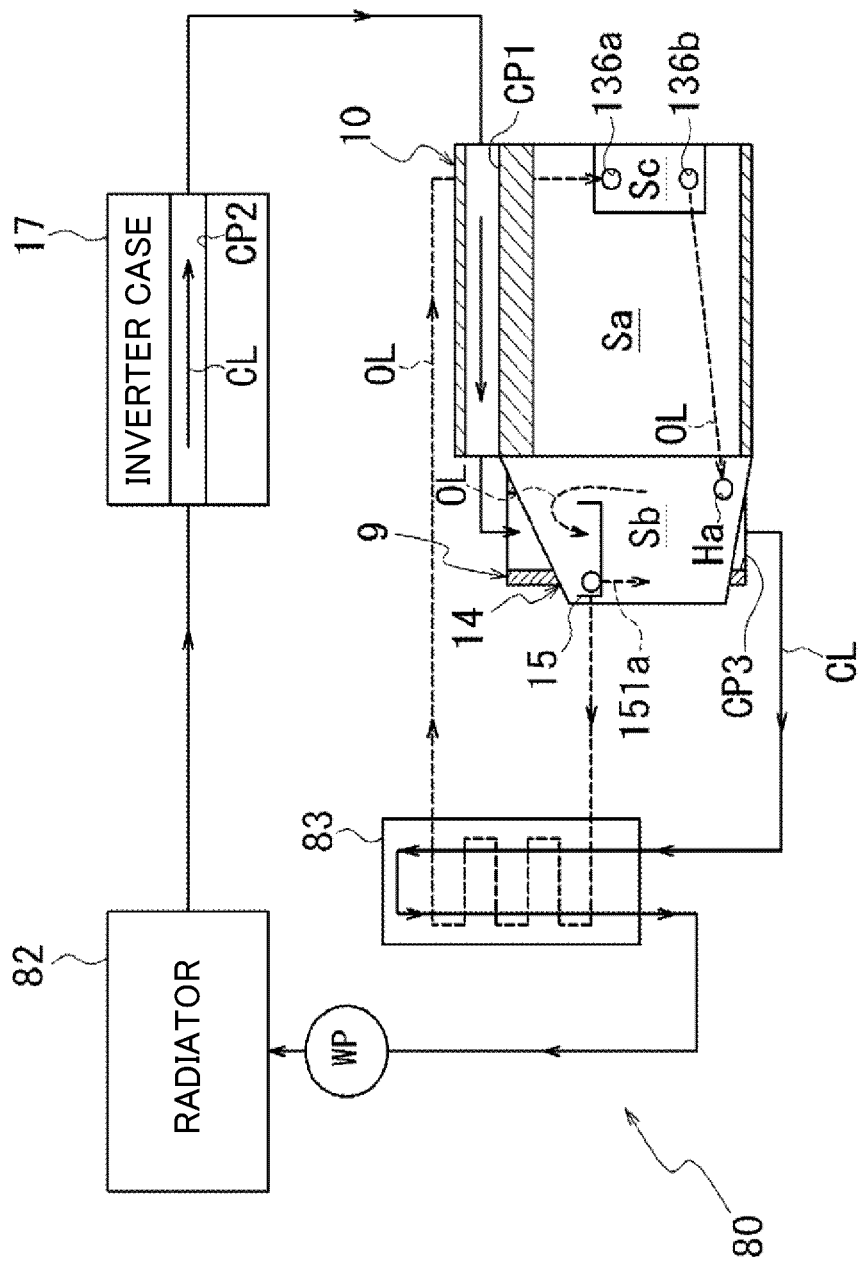
FIG. 6 is a diagram illustrating a flow of cooling water in the unit.

FIG. 6 is a diagram showing a circulation system of cooling water in the unit.

Figure 7:
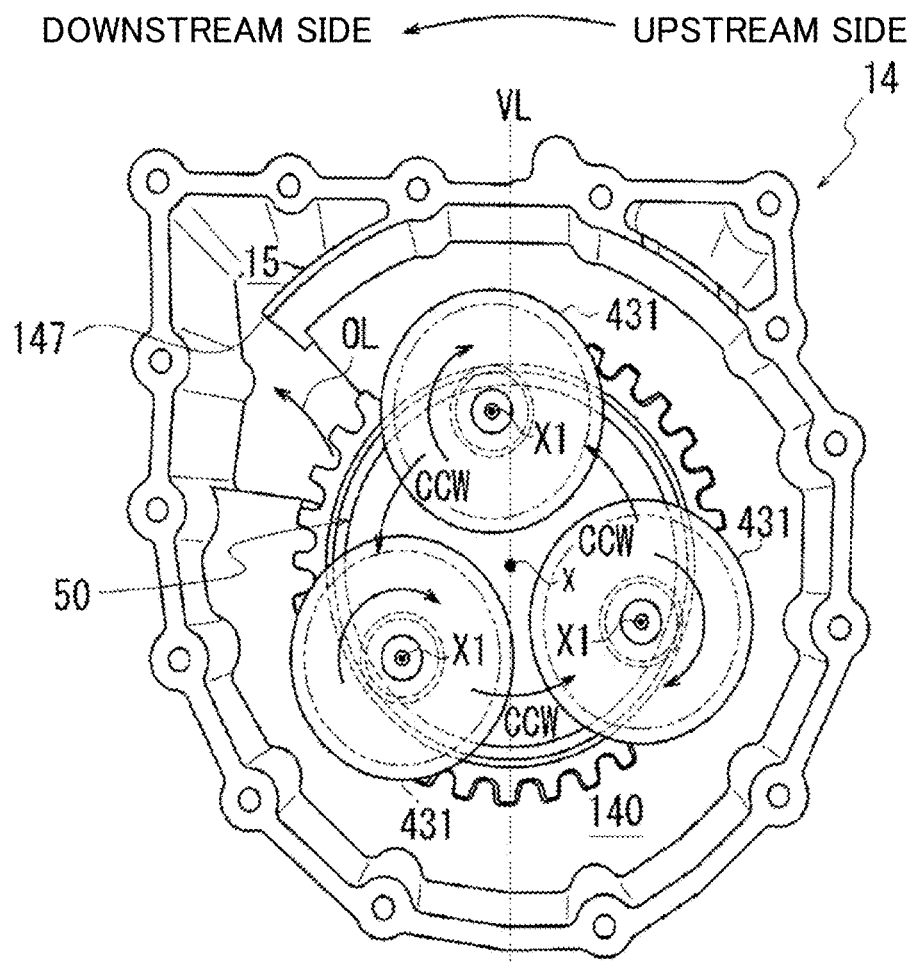
FIG. 7 is a diagram illustrating oil scraping up by a differential case.

FIG. 7 is a diagram illustrating a catch tank of a gear case.

As shown in FIG. 1, a unit 1 is a 3-in-1 unit, and includes a motor 2, a power transmission mechanism 3 that transmits the power output from the motor 2 to drive wheels K and K of a vehicle, and an inverter 7 (see FIG. 2) that is a power conversion device of the motor 2.

In the embodiment, as shown in FIG. 1, the unit 1 includes, as the power transmission mechanism 3, a planetary reduction gear 4 (reduction gear mechanism, planetary gear mechanism), a differential mechanism 5 (differential gear mechanism), and drive shafts DA and DB as output shafts.

In the unit 1, the planetary reduction gear 4, the differential mechanism 5, and the drive shafts DA and DB are provided along a transmission path of output rotation about a rotation axis X of the motor 2. Axes of the drive shafts DA and DB are coaxial with the rotation axis X of the motor 2, and the differential mechanism 5 is coaxial with the motor 2.

In the unit 1, the output rotation of the motor 2 is decelerated by the planetary reduction gear 4 and input to the differential mechanism 5, and then transmitted to the left and right drive wheels K and K of the vehicle on which the unit 1 is mounted via the drive shafts DA and DB.

Here, the planetary reduction gear 4 is connected downstream of the motor 2. The differential mechanism 5 is connected downstream of the motor 2 via the planetary reduction gear 4. The drive shafts DA and DB are connected downstream of the differential mechanism 5.

As shown in FIG. 2, the unit 1 includes, as a 3-in-1 type housing, a housing HS that accommodates the motor 2, the power transmission mechanism 3 and the inverter 7. The housing HS includes one or more cases. The housing HS includes, for example, a motor case 10 that accommodates the motor 2, a gear case 14 that accommodates the power transmission mechanism 3, and an inverter case 17 that accommodates the inverter 7. The gear case 14 is joined to one end of the motor case 10 in a rotation axis X direction. The inverter case 17 is joined above the motor case 10 in a gravity direction when the unit 1 is mounted on the vehicle.

The inverter 7 is an electronic component including a smoothing capacitor, a power semi-conductor element, a driver board, and the like. The inverter 7 is electrically connected to the motor 2 inside the motor case 10 by wiring (not shown).

In the inverter case 17, a cooling path CP2 through which cooling water CL (see FIG. 6) for cooling the inverter 7 flows is formed.

The motor 2 has a portion that overlaps the differential mechanism 5 (differential gear mechanism) when viewed in an axial direction (see FIG. 3). Here, "when viewed in an axial direction" means when viewed from the rotation axis X direction. "When viewed in a radial direction" means when viewed from the radial direction of the rotation axis X direction.

When viewed in the axial direction, the motor 2 has a portion that overlaps the planetary reduction gear 4 (reduction gear mechanism).

When viewed in the axial direction, the planetary reduction gear 4 (reduction gear mechanism) has a portion that overlaps the differential mechanism 5 (differential gear mechanism).

When viewed in the axial direction, the planetary reduction gear 4 (reduction gear mechanism) has a portion that overlaps the motor 2.

When viewed in the axial direction, the differential mechanism 5 (differential gear mechanism) has a portion that overlaps the planetary reduction gear 4 (reduction gear mechanism).

When viewed in the axial direction, the differential mechanism 5 (differential gear mechanism) has a portion that overlaps the motor 2.

When viewed in the axial direction, the motor 2 has a portion that overlaps the differential mechanism 5 (differential gear mechanism).

As shown in FIG. 3, the motor case 10 includes a first case member 11, a second case member 12 fitted onto the first case member 11, and a cover member 13 joined to one end of the first case member 11. The first case member 11 includes a cylindrical support wall portion 111 and a flange-shaped joint portion 112 provided at one end 111a of the support wall portion 111.

The support wall portion 111 is provided in a direction along the rotation axis X of the motor 2. The motor 2 is accommodated inside the support wall portion 111.

The second case member 12 includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 of the second case member 12 is formed with an inner diameter that allows the peripheral wall portion 121 to be fitted onto the support wall portion 111 of the first case member 11.

The first case member 11 and the second case member 12 are assembled by fitting the peripheral wall portion 121 of the second case member 12 onto the support wall portion 111 of the first case member 11.

The joint portion 122 at the one end 121a of the peripheral wall portion 121 comes into contact with the joint portion 112 of the first case member 11 from the rotation axis X direction. The joint portions 122 and 112 are connected with bolts (not shown).

As shown in FIG. 5, a protrusion 111b is provided on an outer periphery of the support wall portion 111 of the first case member 11. The protrusion 111b is a wall surrounding the rotation axis X at intervals. The protrusion 111b of the support wall portion 111 is provided in a spiral shape with a phase shifted from one end toward the other end in the rotation axis X direction. The protrusion 111b surrounds the outer periphery of the support wall portion 111 over the entire circumference of the support wall portion 111.

As shown in FIG. 3, the peripheral wall portion 121 of the second case member 12 is fitted onto the support wall portion 111 of the first case member 11. In this state, since an inner periphery of the peripheral wall portion 121 comes into contact with an outer periphery of the spiral protrusion 111b of the support wall portion 111, a space is formed between the peripheral wall portion 121 and the support wall portion 111. The space surrounds the rotation axis X with gaps therebetween and is continuously formed in a spiral shape in the rotation axis X direction. The spiral space forms a cooling path CP1 through which the cooling water CL (see FIG. 6), which is a coolant, flows. In FIG. 6, the spiral cooling path CP1 is simplified and shown as a straight line.

In the outer periphery of the support wall portion 111 of the first case member 11, ring grooves 111c and 111c are formed on both sides of the region where the protrusion 111b is provided. Seal rings 113 and 113 are fitted and attached to the ring grooves 111c and 111c.

The seal rings 113 are pressed against the inner periphery of the peripheral wall portion 121 fitted onto the support wall portion 111 to seal gaps between the outer periphery of the support wall portion 111 and the inner periphery of the peripheral wall portion 121.

A wall portion 120 (cover) extending radially inward is provided at the other end 121b of the second case member 12. The wall portion 120 is provided in a direction orthogonal to the rotation axis X. An opening 120a through which the drive shaft DA is inserted is provided in a region of the wall portion 120 intersecting the rotation axis X.

A tubular motor support portion 125 that surrounds the opening 120a and extends toward the motor 2 is provided on a surface of the wall portion 120 closer to the motor 2 (right side in the drawing).

The motor support portion 125 is inserted inside a coil end 253b, which will be described later. The motor support portion 125 faces an end portion 21b of a rotor core 21 with a gap therebetween in the rotation axis X direction. A bearing B1 is supported on an inner periphery of the motor support portion 125. An outer periphery of a motor shaft 20 is supported by the motor support portion 125 via a bearing B1.

A tubular wall portion 126 extending toward the differential mechanism 5 is provided on a surface of the wall portion 120 closer to the differential mechanism 5 (left side in the drawing). The tubular wall portion 126 has a cylindrical shape surrounding the opening 120a, and an inner periphery of the tubular wall portion 126 supports a bearing B2. The bearing B2 supports a tubular wall portion 61 of a differential case 50, which will be described later.

The cover member 13 includes a wall portion 130 orthogonal to the rotation axis X and a joint portion 132.

When viewed from the first case member 11, the cover member 13 is positioned on an opposite side (right side in the drawing) to the differential mechanism 5. The joint portion 132 of the cover member 13 is joined to the joint portion 112 of the first case member 11 from the rotation axis X direction. The cover member 13 and the first case member 11 are connected to each other with bolts (not shown). In this state, in the first case member 11, an opening of the support wall portion 111 closer to the joint portion 112 (right side in the drawing) is closed by the cover member 13.

In the cover member 13, an insertion hole 130a for the drive shaft DA is provided in a central portion of the wall portion 130.

A lip seal RS is provided on an inner periphery of the insertion hole 130a. The lip seal RS brings a lip portion (not shown) into elastic contact with an outer periphery of the drive shaft DA. A gap between the inner periphery of the insertion hole 130a and the outer periphery of the drive shaft DA is sealed by the lip seal RS.

A peripheral wall portion 131 surrounding the insertion hole 130a is provided on a surface of the wall portion 130 closer to the first case member 11 (left side in the drawing). The drive shaft DA is supported on an inner periphery of the peripheral wall portion 131 via a bearing B4.

A motor support portion 135 and a connection wall 136 are provided on an inner diameter side of the joint portion 132. The motor support portion 135 is provided closer to the motor 2 (left side in the drawing) when viewed from the peripheral wall portion 131. The motor support portion 135 has a tubular shape surrounding the rotation axis X with a gap therebetween.

The cylindrical connection wall 136 is connected to an outer periphery of the motor support portion 135. The connection wall 136 is formed with a larger outer diameter than the peripheral wall portion 131 in the wall portion 130 (right side in the drawing). The connection wall 136 is provided along the rotation axis X and extends away from the motor 2. The connection wall 136 connects the motor support portion 135 and the joint portion 132.

One end 20a of the motor shaft 20 penetrates the inside of the motor support portion 135 from the motor 2 side to the peripheral wall portion 131 side.

A bearing B1 is supported on an inner periphery of the motor support portion 135. The outer periphery of the motor shaft 20 is supported by the motor support portion 135 via the bearing B1.

A lip seal RS is provided at a position adjacent to the bearing B1.

Oil holes 136a and 136b are opened in an inner periphery of the connection wall 136. Oil OL flows from the oil hole 136a into a space (internal space Sc) surrounded by the connection wall 136. The oil OL flowing into the internal space Sc is discharged from the oil hole 136b. The lip seal RS is provided to prevent the oil OL in the connection wall 136 from flowing into the motor 2.

The gear case 14 includes a peripheral wall portion 141 and a flange-shaped joint portion 142 provided at an end portion of the peripheral wall portion 141 closer to the motor case 10. A support portion 145 for a bearing B2, which will be described later, is provided at an end portion of the peripheral wall portion 141 on a side (left side in the drawing) opposite to the joint portion 142. The peripheral wall portion 141 includes a tubular wall portion 141a connected to the joint portion 142, an inclined portion 141c (wall portion) connected to the support portion 145, and a connection wall portion 141b connecting the tubular wall portion 141a and the inclined portion 141c. The tubular wall portion 141a and the connection wall portion 141b are gradually reduced in diameter from the joint portion 142 and connected to the inclined portion 141c. The inclined portion 141c is inclined radially inward from the connection wall portion 141b toward the support portion 145. The planetary reduction gear 4 and the differential mechanism 5 as the power transmission mechanism 3 are accommodated inside the peripheral wall portion 141.

The gear case 14 is positioned closer to the differential mechanism 5 (left side in the drawing) when viewed from the motor case 10. The joint portion 142 of the gear case 14 is joined to the joint portion 123 of the second case member 12 of the motor case 10 from the rotation axis X direction. The gear case 14 and the second case member 12 are connected to each other with bolts (not shown).

A space formed inside the joined motor case 10 and gear case 14 is divided into two spaces by the wall portion 120 (cover) of the second case member 12. A side of the wall portion 120 in the motor case 10 is a motor chamber Sa that accommodates the motor 2, and a side of the wall portion 120 in the gear case 14 is a gear chamber Sb that accommodates the planetary reduction gear 4 and the differential mechanism 5. The wall portion 120 as a cover is sandwiched between the motor 2 and the differential mechanism 5 inside the housing HS.

The cover may have a portion accommodated in the housing HS, or the entire cover may be accommodated in the housing HS like the wall portion 120. The cover may be, for example, separate from the second case member 12. In this case, the cover may be sandwiched and fixed between the motor case 10 and the gear case 14. A part of the cover may be exposed outside of the housing HS.

The motor 2 includes the cylindrical motor shaft 20, the cylindrical rotor core 21 fitted onto the motor shaft 20, and a stator core 25 surrounding an outer periphery of the rotor core 21 with a gap therebetween.

In the motor shaft 20, the bearings B1 and B1 are fitted and fixed to both sides of the rotor core 21.

The bearing B1 positioned on the one end 20a (right side in the drawing) of the motor shaft 20 when viewed from the rotor core 21 is supported on the inner periphery of the motor support portion 135 of the cover member 13. The bearing B1 positioned on the other end 20b (left side in the drawing) is supported on the inner periphery of the cylindrical motor support portion 125 of the second case member 12.

The motor support portion 135 is disposed facing one end portion 21a of the rotor core 21 with a gap therebetween in the rotation axis X direction on an inner diameter side of a coil end 253a, which will be described later, and the motor support portion 125 is disposed facing the other end portion 21b of the rotor core 21 with a gap therebetween in the rotation axis X direction on an inner diameter side of a coil end 253b, which will be described later.

The rotor core 21 is formed by laminating a plurality of silicon steel plates. Each of the silicon steel plates is fitted onto the motor shaft 20 in a state in which relative rotation with respect to the motor shaft 20 is restricted.

When viewed from the rotation axis X direction of the motor shaft 20, the silicon steel plate has a ring shape. On an outer peripheral side of the silicon steel plate, N-pole and S-pole magnets (not shown) are alternately provided in a circumferential direction around the rotation axis X.

The stator core 25 surrounding the outer periphery of the rotor core 21 is formed by laminating a plurality of electromagnetic steel plates. The stator core 25 is fixed to the inner periphery of the cylindrical support wall portion 111 of the first case member 11.

Each of the electromagnetic steel plates includes a ring-shaped yoke portion 251 fixed to the inner periphery of the support wall portion 111, and a teeth portion 252 protruding from an inner periphery of the yoke portion 251 toward the rotor core 21.

In the present embodiment, the stator core 25 in which a winding 253 is wound around the plurality of teeth portions 252 in a distributed manner is adopted. The stator core 25 is longer than the rotor core 21 in the rotation axis X direction by lengths of the coil ends 253a and 253b protruding in the rotation axis X direction.

A stator core in which windings are concentratedly wound around each of the plurality of teeth portions 252 protruding toward the rotor core 21 may be adopted.

The opening 120a is provided in the wall portion 120 (motor support portion 125) of the second case member 12. The other end 20b of the motor shaft 20 penetrates through the opening 120a to the differential mechanism 5 (left side in the drawing) and is positioned in the gear case 14.

The other end 20b of the motor shaft 20 faces a side gear 54A, which will be described later, inside the gear case 14 with a gap therebetween in the rotation axis X direction.

A lip seal RS is inserted between the motor shaft 20 and the opening 120a of the wall portion 120.

The oil OL for lubricating the planetary reduction gear 4 and the differential mechanism 5 are sealed on an inner diameter side of the gear case 14.

The lip seal RS is provided to prevent the oil OL in the gear case 14 from flowing into the motor case 10.

As shown in FIG. 4, a sun gear 41 of the planetary reduction gear 4 is spline-fitted in a region of the motor shaft 20 positioned in the gear case 14.

A teeth portion 41a is formed on an outer periphery of the sun gear 41, and a large-diameter gear portion 431 of a stepped pinion gear 43 meshes with the teeth portion 41a.

The stepped pinion gear 43 includes the large-diameter gear portion 431 (large pinion) that meshes with the sun gear 41 and a small-diameter gear portion 432 (small pinion) that has a smaller diameter than the large-diameter gear portion 431.

The large-diameter gear portion 431 and the small-diameter gear portion 432 are integrated gear components disposed side by side in a direction of an axis X1 parallel to the rotation axis X.

An outer periphery of the small-diameter gear portion 432 meshes with an inner periphery of a ring gear 42. The ring gear 42 has a ring shape surrounding the rotation axis X with a gap therebetween. On an outer periphery of the ring gear 42, engagement teeth are provided, and the engagement teeth are spline-fitted to a teeth portion 146a provided on an inner periphery of the connection wall portion 141b. The ring gear 42 is restricted from rotating about the rotation axis X.

A pinion shaft 44 penetrates inner diameter sides of the large-diameter gear portion 431 and the small-diameter gear portion 432. The stepped pinion gear 43 is rotatably supported on an outer periphery of the pinion shaft 44 via needle bearings NB, NB.

As shown in FIG. 3, the differential mechanism 5 includes the differential case 50 as an input element, the drive shafts DA and DB (output shafts) as output elements, and a differential gear set as a differential element. Although detailed description is omitted, the differential case 50 may be configured by two case members assembled in a rotation axis direction.

The differential case 50 also functions as a carrier that supports the stepped pinion gear 43 of the planetary reduction gear 4. The stepped pinion gear 43 is rotatably supported by the differential case 50 via the pinion shaft 44. As shown in FIG. 7, three stepped pinion gears 43 are disposed at intervals in the circumferential direction around the rotation axis X.

As shown in FIG. 3, in the differential case 50, as the differential gear set, a pinion mate gear 52, which is a bevel gear type differential gear, and side gears 54A and 54B are provided. The pinion mate gear 52 is supported by a pinion mate shaft 51.

The pinion mate shaft 51 includes a central member 510 disposed on the rotation axis X and shaft members 511 connected to an outer diameter side of the central member 510. Although not shown, the plurality of shaft members 511 are provided at equal intervals in the circumferential direction around the rotation axis X. The shaft members 511 are inserted through a support hole 69 extending in a radial direction of the differential case 50 and supported.

The pinion mate gear 52 is fitted onto the shaft members 511 and is rotatably supported.

In the differential case 50, the side gear 54A is positioned on one side of the central member 510 in the rotation axis X direction, and the side gear 54B is positioned on the other side of the central member 510. The side gears 54A and 54B are rotatably supported by the differential case 50.

The side gear 54A meshes with the pinion mate gear 52 from one side in the rotation axis X direction. The side gear 54B meshes with the pinion mate gear 52 from the other side in the rotation axis X direction.

An opening 60 and a tubular wall portion 61 surrounding the opening 60 and extending toward the motor case 10 are provided in a central portion of one end (right side in the drawing) of the differential case 50. An outer periphery of the tubular wall portion 61 is supported by the wall portion 120 of the second case member 12 via the bearing B2.

The drive shaft DA inserted through the opening 60 is inserted into the differential case 50 from the rotation axis X direction. The drive shaft DA penetrates the insertion hole 130a of the wall portion 130 of the cover member 13, and is provided across inner diameter sides of the motor shaft 20 of the motor 2 and the sun gear 41 of the planetary reduction gear 4 in the rotation axis X direction.

As shown in FIG. 3, a through hole 65 and a tubular wall portion 66 surrounding the through hole 65 are formed in a central portion on the other end side (left side in the drawing) of the differential case 50. The bearing B2 is fitted onto the tubular wall portion 66. The bearing B2 fitted onto the tubular wall portion 66 is held by the support portion 145 of the gear case 14. The tubular wall portion 66 of the differential case 50 is rotatably supported by the gear case 14 via the bearing B2.

The drive shaft DB penetrating an opening 145a of the gear case 14 is inserted into the support portion 145 from the rotation axis X direction. The drive shaft DB is rotatably supported by the support portion 145. The tubular wall portion 66 functions as a shaft support portion that supports the outer periphery of the drive shaft DB.

A lip seal RS is fixed to an inner periphery of the opening 145a. A lip portion (not shown) of the lip seal RS is in elastic contact with an outer periphery of the tubular wall portion 540 of the side gear 54B that is fitted onto the drive shaft DB.

Thus, a gap between the outer periphery of the tubular wall portion 540 of the side gear 54B and the inner periphery of the opening 145a is sealed.

Inside the differential case 50, distal end portions of the drive shafts DA and DB face each other with a gap therebetween in the rotation axis X direction.

The side gears 54A and 54B supported by the differential case 50 are spline-fitted to outer peripheries of the distal end portions of the drive shafts DA and DB. The side gears 54A and 54B and the drive shafts DA and DB are coupled to each other so as to be integrally rotatable about the rotation axis X.

In this state, the side gears 54A and 54B are disposed facing each other with a gap therebetween in the rotation axis X direction. The central member 510 of the pinion mate shaft 51 is positioned between the side gears 54A and 54B.

The pinion mate gear 52 is assembled to the side gear 54A positioned on one side in the rotation axis X direction and the side gear 54B positioned on the other side in a state in which teeth portions thereof are meshed with each other.

As shown in FIG. 4, a support hole 62 at one end 44a of the pinion shaft 44 is formed an outer diameter side of the opening 60 at the one end (right side in the drawing) of the differential case 50. A support hole 68 at the other end 44b of the pinion shaft 44 is formed at the other end (left side in the drawing) of the differential case 50.

The support holes 62 and 68 are formed at overlapping positions in the rotation axis X direction. The support holes 62 and 68 are formed at intervals in the circumferential direction around the rotation axis X in accordance with the position where the stepped pinion gear 43 is disposed. The one end 44a of the pinion shaft 44 is inserted into the support hole 62, and the other end 44b is inserted into the support hole 68. The other end 44b of the pinion shaft 44 is press-fitted into the support hole 68, so that the pinion shaft 44 is fixed to the differential case 50 so as not to be rotatable relative to the differential case 50. The stepped pinion gear 43 fitted onto the pinion shaft 44 is rotatably supported about the axis X1 parallel to the rotation axis X.

Although not shown, the oil OL for lubrication is stored inside the gear case 14. When the differential case 50 rotates about the rotation axis X, the oil OL is scraped up by the differential case 50.

Although detailed description is omitted, an oil passage, an oil hole, and the like for introducing the oil OL scraped up by the differential case 50 are provided in the differential case 50, the pinion shaft 44, and the like. As a result, the oil OL is easily introduced into rotating members such as the bearing B2 and the needle bearing NB.

As shown in FIG. 7, a catch tank 15 is provided above the differential case 50 inside the gear case 14. The catch tank 15 is positioned on one side (left side in the drawing) of a vertical line VL orthogonal to the rotation axis X. The catch tank 15 and an accommodation portion 140 of the differential case 50 communicate with each other via a communication port 147. Part of the oil OL scraped up by the differential case 50 and scattered flows into the catch tank 15 from the communication port 147 and is collected.

When the vehicle equipped with the unit 1 travels forward, the differential case 50 rotates in a counterclockwise direction CCW about the rotation axis X when viewed from the motor case 10. As shown in FIG. 4, the small-diameter gear portion 432 of the stepped pinion gear 43 meshes with the ring gear 42 fixed to an inner periphery of the gear case 14. Therefore, as shown in FIG. 7, the large-diameter gear portion 431 of the stepped pinion gear 43 revolves about the rotation axis X in the counterclockwise direction CCW while rotating clockwise about the axis X1.

The catch tank 15 is positioned on the left side of the vertical line VL, that is, on a downstream side in a rotation direction of the differential case 50. As a result, most of the oil OL scraped up by the differential case 50 rotating about the rotation axis X can flow into the catch tank 15.

As shown in FIG. 3, the catch tank 15 is connected to a space Rx between the lip seal RS and the bearing B2 via an oil passage 151a. The catch tank 15 is connected to an oil cooler 83 (see FIG. 6) via an oil passage, a pipe, or the like (not shown). The oil cooler 83 is connected to the oil hole 136a (see FIG. 3) formed in the connection wall 136 via a pipe, an oil passage, or the like (not shown). In FIG. 3, the catch tank 15 is indicated by an imaginary line for description, and the actual position of the catch tank 15 is not reflected.

An oil hole Ha is formed in the peripheral wall portion 141 of the gear case 14. The oil hole Ha is connected to the oil hole 136b formed in the internal space Sc via a pipe (not shown). The oil OL discharged from the internal space Sc through the oil hole 136b is supplied again into the gear chamber Sb through the oil hole Ha.

As shown in FIG. 2, a cooling chamber 9 is provided in the inclined portion 141c (wall portion) of the gear case 14. As shown in FIG. 6, a cooling path CP3 through which the cooling water CL flows is provided inside the cooling chamber 9. The cooling water CL after flowing through the cooling path CP1 of the motor case 10 is introduced into the cooling path CP3.

As shown in FIG. 6, the unit 1 is provided with a circulation system 80 for the cooling water CL. The circulation system 80 circulates the cooling water CL between the cooling path CP1 of the motor case 10, the cooling path CP2 of the inverter case 17, and the cooling path CP3 of the cooling chamber 9. The circulation system 80 further includes the oil cooler 83, a water pump WP, and a radiator 82 between the cooling path CP3 and the cooling path CP2, which are connected by pipes or the like through which the cooling water CL flows.

The water pump WP feeds the cooling water CL through the circulation system 80.

The radiator 82 is a device that dissipates the heat of the cooling water CL to cool the cooling water CL.

The oil cooler 83 is a heat exchanger that exchanges heat between the cooling water CL and the oil OL. The oil OL collected by the catch tank 15 provided in the gear chamber Sb of the gear case 14 is introduced into the oil cooler 83. The oil OL is cooled by heat exchange with the cooling water CL. The cooled oil OL is supplied from the oil hole 136a of the motor case 10 to the internal space Sc. The oil OL supplied to the oil cooler 83 is not limited to the oil OL collected by the catch tank 15, and may be supplied from another oil passage appropriately provided in the housing HS. The oil OL discharged from the oil cooler 83 may be supplied to a location other than the internal space Sc.

The cooling water CL is supplied to the oil cooler 83 after flowing through the cooling path CP3 of the cooling chamber 9. After the heat exchange with the oil OL in the oil cooler 83, the cooling water CL is cooled by the radiator 82 and supplied to the cooling path CP2 of the inverter case 17 again.

As shown in FIG. 2, the cooling chamber 9 is provided in the inclined portion 141c (wall portion) of the gear case 14.

The inclined portion 141c has a truncated cone shape that decreases in diameter in a direction away from the motor case 10. A space around the inclined portion 141c is larger than a space around the motor case 10 and the like of the unit 1 by the reduced diameter of the gear case 14. In the embodiment, the cooling chamber 9 is disposed in the space around the inclined portion 141c. Hereinafter, a configuration of the cooling chamber 9 will be described.

Figure 8:
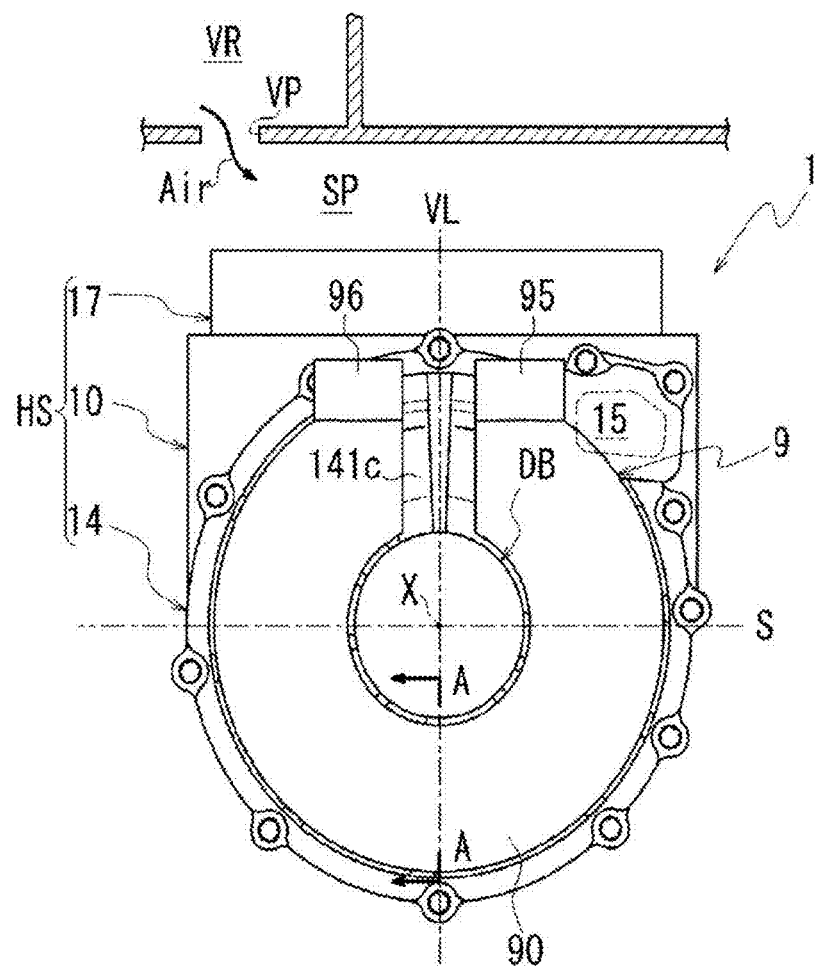
FIG. 8 is a diagram of a gear case when viewed from a rotation axis direction.

FIG. 8 is a diagram of the gear case 14 when viewed from the rotation axis X direction.

Figure 9:
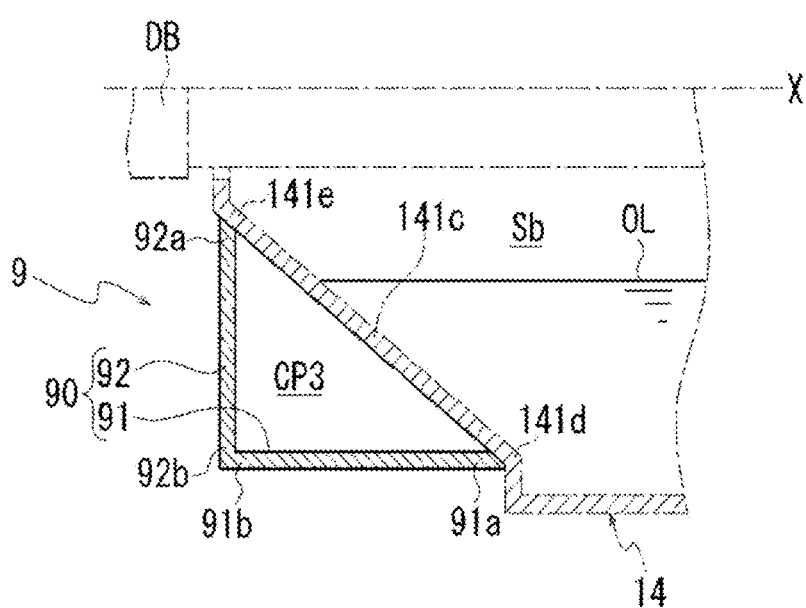
FIG. 9 is a cross-sectional view of a cooling chamber taken along line A-A in FIG. 8.

FIG. 9 is a cross-sectional view of a main body portion 90 of the cooling chamber 9 taken along line A-A in FIG. 8. In FIG. 9, the gear case 14 and the drive shaft DB are indicated by imaginary lines for convenience of description.

Figure 10:
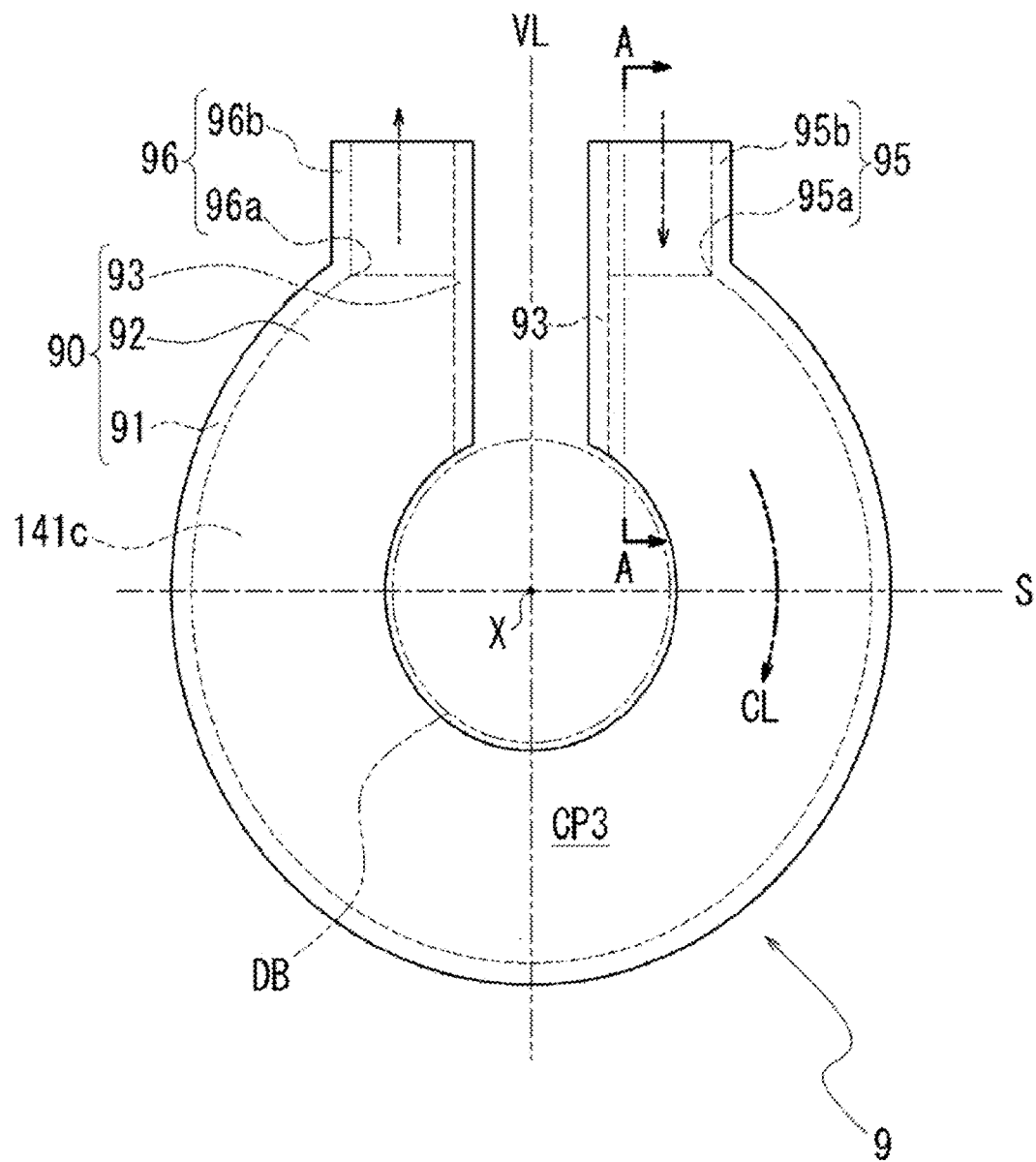
FIG. 10 is a diagram illustrating a cooling path in the cooling chamber.

FIG. 10 is a diagram illustrating the cooling path CP3 inside the cooling chamber 9. In FIG. 10, the inside of the cooling chamber 9 is indicated by a broken line.

Figure 11:
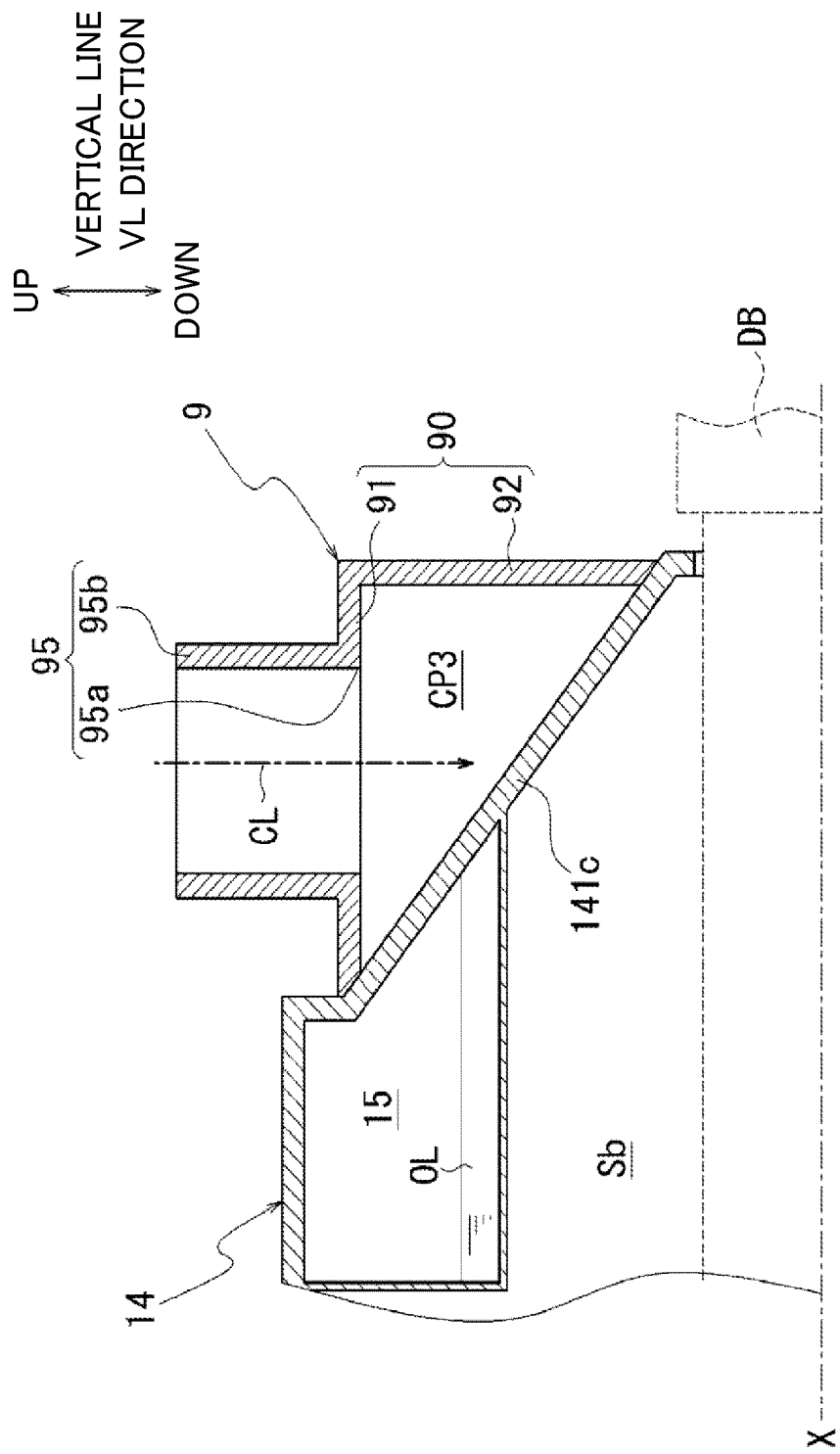
FIG. 11 is a schematic cross-sectional view taken along line A-A in FIG. 10.

FIG. 11 is a schematic cross-sectional view taken along line A-A in FIG. 10. In FIG. 11, the inside of the gear case 14 is simplified.

As shown in FIG. 8, the cooling chamber 9 is disposed adjacent to the catch tank 15 provided in an upper portion of the gear case 14. The cooling chamber 9 includes the main body portion 90 (arc-shaped portion) that is an arc-shaped member when viewed from the rotation axis X direction. The main body portion 90 is disposed in the circumferential direction around the rotation axis X so as to surround the drive shaft DB, and is joined to the inclined portion 141*c*. As shown in FIG. 9, the main body portion 90 is joined to an end portion 141*d* closer to the motor case 10 (right side in the drawing) of the inclined portion 141*c* and an end portion 141*e* on the opposite side (left side in the drawing).

As shown in FIG. 9, the main body portion 90 includes a first wall portion 91 and a second wall portion 92.

In the first wall portion 91, one end portion 91*a* is joined to the one end portion 141*d* of the inclined portion 141*c*. The first wall portion 91 extends along the rotation axis X direction. The other end portion 91*b* of the first wall portion 91 is spaced apart from the inclined portion 141*c*.

In the second wall portion 92, one end portion 92*a* is joined to the end portion 141*e*. The second wall portion 92 extends radially outward of the rotation axis X. The second wall portion 92 is provided in a direction substantially orthogonal to the rotation axis X when the main body portion 90 is attached to the gear case 14. The other end portion 92*b* of the second wall portion 92 is connected to the end portion 91*b* of the first wall portion 91.

As shown in FIG. 9, in the cooling chamber 9, a triangular space surrounded by the first wall portion 91 and the second wall portion 92 of the main body portion 90 and the inclined portion 141*c* is formed in a cross-sectional view. This space constitutes the cooling path CP3 through which the cooling water CL, which is a coolant, flows. That is, the cooling path CP3, which is a flow path through which a coolant flows, is a portion integrally formed with the housing HS.

As shown in FIG. 11, the inclined portion 141*c* constitutes part of a wall surface of the catch tank 15 formed inside the gear case 14. That is, the cooling path CP3 and the catch tank 15 are adjacent to each other with the inclined portion 141*c* interposed therebetween.

As shown in FIG. 10, when viewed from the rotation axis X direction, the cooling path CP3 has an arc shape extending from one side of the vertical line VL orthogonal to the rotation axis X to the other side of the vertical line VL via a lower side of the rotation axis X. One end and the other end in a longitudinal direction of the cooling path CP3 are closed by third wall portions 93 of the main body portion 90. The third wall portions 93 and 93 extend and are connected to the first wall portion 91, the second wall portion 92, and a wall surface of the inclined portion 141*c*.

As shown in FIG. 10, the cooling path CP3 has an arc shape surrounding the rotation axis X when viewed from the rotation axis X direction. With respect to a horizontal plane S passing through the rotation axis X and orthogonal to the vertical line VL, the cooling path CP3 has a portion positioned above the horizontal plane S and a portion positioned below the horizontal plane S.

An introduction portion 95 and a discharge portion 96 for the cooling water CL are provided above the main body portion 90 in the vertical line VL direction.

The introduction portion 95 has an opening 95*a* provided through the first wall portion 91 of the main body portion 90, and a peripheral wall portion 95*b* surrounding the opening 95*a* and extending upward in the vertical line VL direction. The introduction portion 95 communicates with one end side (right side in the drawing) of the cooling path CP3 in the circumferential direction around the rotation axis X through the opening 95*a*.

The discharge portion 96 has an opening 96*a* provided through the first wall portion 91 of the main body portion 90, and a peripheral wall portion 96*b* surrounding the opening 96*a* and extending upward in the vertical line VL direction. The discharge portion 96 communicates with the other end side (left side in the drawing) of the cooling path CP3 in the circumferential direction around the rotation axis X through the opening 96*a*.

The introduction portion 95 and the discharge portion 96 are positioned above the horizontal plane S. The cooling path CP3 has a portion positioned above the horizontal plane S and connected to the introduction portion 95 and the discharge portion 96, and a portion positioned below the horizontal plane S. In other words, the introduction portion 95 is connected to the discharge portion 96 via the portion of the cooling path CP3 positioned below the horizontal plane S.

The peripheral wall portion 95*b* of the introduction portion 95 is connected to the cooling path CP1 (see FIG. 6) of the motor case 10 via a pipe or the like (not shown). The peripheral wall portion 96*b* of the discharge portion 96 is connected to the radiator 82 (see FIG. 6) via a pipe or the like (not shown). As shown in FIG. 8, the catch tank 15 is positioned on one side of the vertical line VL on which the introduction portion 95 is disposed when viewed from the rotation axis X direction.

As shown in FIG. 11, an inner surface of the inclined portion 141*c* comes into contact with the oil OL stored in the catch tank 15 above the rotation axis X. As shown in FIG. 9, the inner surface of the inclined portion 141*c* comes into contact with the oil OL stored in the gear chamber Sb below the rotation axis X.

On the other hand, an outer surface of the inclined portion 141*c* comes into contact with the cooling water CL introduced into the cooling path CP3. That is, the oil OL inside the gear case 14 and the cooling water CL in the cooling path CP3 can exchange heat via the inclined portion 141*c* which is a wall portion.

The operation of the unit 1 having such a configuration will be described.

As shown in FIG. 1, in the unit 1, the planetary reduction gear 4, the differential mechanism 5, and the drive shafts DA and DB are provided along a transmission path of output rotation of the motor 2.

As shown in FIG. 3, when the motor 2 is driven and the rotor core 21 rotates about the rotation axis X, the rotation is input to the sun gear 41 of the planetary reduction gear 4 via the motor shaft 20 that rotates integrally with the rotor core 21.

In the planetary reduction gear 4, the sun gear 41 serves as an input portion for the output rotation of the motor 2, and the differential case 50 supporting the stepped pinion gear 43 serves as an output portion for the input rotation.

As shown in FIG. 4, when the sun gear 41 rotates about the rotation axis X by the input rotation, the stepped pinion gear 43 (large-diameter gear portion 431 and small-diameter gear portion 432) rotates about the axis X1 by the rotation input from the sun gear 41.

Here, the small-diameter gear portion 432 of the stepped pinion gear 43 meshes with the ring gear 42 fixed to the inner periphery of the gear case 14. Therefore, the stepped pinion gear 43 revolves around the rotation axis X while rotating about the axis X1.

Here, in the stepped pinion gear 43, an outer diameter of the small-diameter gear portion 432 is smaller than an outer diameter of the large-diameter gear portion 431.

As a result, the differential case 50 supporting the stepped pinion gear 43 rotates about the rotation axis X at a rotation speed lower than that of the rotation input from the motor 2.

Therefore, the rotation input to the sun gear 41 of the planetary reduction gear 4 is greatly decelerated by the stepped pinion gear 43 and then output to the differential case 50 (differential mechanism 5).

As shown in FIG. 3, when the differential case 50 rotates about the rotation axis X by the input rotation, the drive shafts DA and DB meshing with the pinion mate gear 52 rotate about the rotation axis X in the differential case 50. As a result, the left and right drive wheels K and K (see FIG. 1) of the vehicle equipped with the unit 1 are rotated by the transmitted rotational driving force.

As shown in FIG. 3, the oil OL for lubrication is stored in the gear chamber Sb. In the gear chamber Sb, when the output rotation of the motor 2 is transmitted, the stored oil OL is scraped up by the differential case 50 rotating about the rotation axis X.

As shown in FIGS. 3 and 4, the scraped-up oil OL lubricates a meshing portion between the sun gear 41 and the large-diameter gear portion 431, a meshing portion between the small-diameter gear portion 432 and the ring gear 42, and meshing portions between the pinion mate gear 52 and the side gears 54A and 54B.

As shown in FIG. 7, the differential case 50 rotates in the counterclockwise direction CCW about the rotation axis X.

The catch tank 15 is provided on an upper portion of the gear case 14. The catch tank 15 is positioned on the downstream side in the rotation direction of the differential case 50, and part of the oil OL scraped up by the differential case 50 flows into the catch tank 15.

As shown in FIG. 3, part of the oil OL flowing into the catch tank 15 is supplied to the space Rx between the lip seal RS and the bearing B2 via the oil passage 151a to lubricate the bearing B2. Part of the oil OL flowing into the catch tank 15 is introduced into the oil cooler 83 via an oil passage, pipe, or the like (not shown), and is cooled by heat exchange with the cooling water CL.

The cooled oil OL is discharged from the oil cooler 83 and supplied to the internal space Sc (see FIG. 3) formed in the connection wall 136 via an oil passage, a pipe, or the like (not shown). The oil OL supplied to the internal space Sc lubricates the bearings B1 and B4 and is discharged from the oil hole 136b. The oil OL discharged from the oil hole 136b is supplied into the gear chamber Sb from the oil hole Ha via a pipe or the like (not shown).

As shown in FIG. 3, the gear case 14 of the housing HS includes the inclined portion 141c as a wall portion surrounding the differential mechanism 5 in the radial direction of the rotation axis X. As shown in FIG. 2, the cooling chamber 9 is disposed in the inclined portion 141c. The cooling path CP3 is provided inside the cooling chamber 9.

As shown in FIG. 10, the cooling water CL after flowing through the cooling path CP2 (see FIG. 6) is introduced into the cooling path CP3 through the peripheral wall portion 95b and the opening 95a of the introduction portion 95. The cooling water CL introduced to the one end in the longitudinal direction of the cooling path CP3 flows toward the discharge portion 96 on the other end of the cooling path CP3.

As shown in FIGS. 9 and 11, the inclined portion 141c constitutes a part of the cooling path CP3. That is, the outer surface of the inclined portion 141c comes into contact with the cooling water CL flowing through the cooling path CP3. The heat exchange between the inclined portion 141c and the cooling path CP3 reduces the temperature rise of the gear case 14 of the housing HS.

Further, the inner surface of the inclined portion 141c comes into contact with the oil OL in the gear chamber Sb. Specifically, the inner surface of the inclined portion 141c comes into contact with the oil OL stored in the catch tank 15 above the rotation axis X (above horizontal plane S in FIG. 8) (see FIG. 11). The inner surface of the inclined portion 141c comes into contact with the oil OL stored in a lower portion of the gear chamber Sb below the rotation axis X (below horizontal plane S in FIG. 8).

As described above, since the inclined portion 141c comes into contact with the oil OL, the heat of the oil OL is transmitted to the inclined portion 141c. That is, the heat is exchanged between the oil OL in the gear chamber Sb and the cooling water CL flowing through the cooling path CP3 via the inclined portion 141c. The oil OL whose temperature rises by the heat exchange with the components inside the gear chamber Sb is cooled by the heat exchange with the cooling water CL whose temperature is lower than that of the oil OL.

As described above, since the inclined portion 141c of the gear case 14 constitutes a part of the cooling path CP3, the cooling water CL directly comes into contact with the inclined portion 141c, so that the efficiency of the heat exchange with the oil OL can be improved.

The cooling water CL that exchanges heat with the oil OL is discharged from the cooling path CP3 via the opening 96a and the peripheral wall portion 96b of the discharge portion 96. The cooling water CL discharged from the cooling path CP3 is cooled by the radiator 82 (see FIG. 6) and then supplied to the cooling path CP2.

As shown in FIG. 2, the cooling chamber 9 forming the cooling path CP3 is disposed at a position overlapping the inclined portion 141c of the housing HS in the rotation axis X direction. Disposing the cooling chamber 9 utilizing the space around the inclined portion 141c contributes to a reduction in dimension of the unit 1 in the radial direction of the rotation axis X.

As shown in FIG. 8, the cooling chamber 9 disposed to surround the inclined portion 141c overlaps the inclined portion 141c in the radial direction of the rotation axis X. This also contributes to a reduction in dimension of the unit 1 in the rotation axis X direction.

As shown in FIG. 8, the main body portion 90 of the cooling chamber 9 has the portion positioned above the horizontal plane S passing through the rotation axis X and orthogonal to the vertical line VL direction. As shown in FIG. 2, the main body portion 90 has a portion positioned above the differential mechanism 5 in the vertical line VL direction. Further, the main body portion 90 has a portion overlapping the stepped pinion gear 43 in the rotation axis X direction. As described above, the main body portion 90 of the cooling chamber 9 has a portion positioned on an upper side in the vertical line VL direction in the unit 1.

As shown in FIG. 3, in the unit 1, the motor 2 and the differential mechanism 5 are coaxial, and the differential mechanism 5 has a portion overlapping the motor 2 when viewed in the rotation axis X direction. As described above, in the unit 1 in which the motor 2 and the differential mechanism 5 are coaxial, the layout on the upper side in the vertical line VL direction (vehicle height direction) is less constrained than on a lower side in the vertical line VL direction (vehicle height direction). Since the main body portion 90 of the cooling chamber 9 has the portion positioned on the upper side in the vertical line VL direction in which the layout is less constrained in the unit 1, a flow path area of the cooling water CL in the cooling path CP3 can be increased. As a result, an area where the cooling water CL comes into contact with the outer surface of the inclined portion 141c is increased, and a heat exchange rate with the oil OL can be improved.

The introduction portion 95 of the cooling water CL positioned above the horizontal plane S is connected to the discharge portion 96 via the cooling path CP3 having the portion positioned below the horizontal plane S. As a result, the cooling water CL introduced into the cooling path CP3 from the introduction portion 95 can flow to the discharge portion 96 using gravity. As described above, the circulation system 80 (see FIG. 6) is provided with the water pump WP that feeds the cooling water CL, and the cooling water CL can flow more smoothly using gravity.

As shown in FIG. 8, the cooling chamber 9 is disposed adjacent to the catch tank 15, and the catch tank 15 is positioned on the introduction portion 95 of the cooling water CL side. The temperature of the cooling water CL rises as the cooling water CL flows through the cooling path CP3 and exchanges heat with the oil OL. The temperature of the cooling water CL in the introduction portion 95 before heat exchange is lower than that of the cooling water CL in the discharge portion 96. By positioning the catch tank 15 closer to the introduction portion 95, heat can be exchanged between the oil OL stored in the catch tank 15 and the low-temperature cooling water CL on the introduction portion 95 side, and the heat exchange efficiency can be improved.

The unit 1 may be disposed on a rear side of the vehicle which is less likely to be affected by the traveling wind of the vehicle. As shown in FIG. 8, when the unit 1 is mounted on the vehicle, a vehicle room VR is disposed above a space SP in which the unit 1 is disposed. The vehicle is provided with a ventilation port VP that communicates the space SP in which the unit 1 is disposed with the vehicle room VR.

By driving an air conditioner in the vehicle room VR or opening windows of the vehicle room VR, the air Air in the vehicle room VR is discharged from the ventilation port VP and flows into the space SP. The temperature of the air Air in the vehicle room VR is adjusted in accordance with the outside air temperature. For example, when the outside air temperature is high, cooling is used in the vehicle or the windows are opened. For example, when the outside air temperature is low, heating is used.

When the air Air whose temperature is adjusted according to the outside air temperature flows into the space SP, the air exchanges heat with the housing HS disposed in the space SP. As a result, on the rear side of the vehicle which is less likely to be affected by the traveling wind, the heat can be exchanged in a direction in which the temperature of the housing HS approaches the proper temperature. Further, the cooling chamber 9 attached to the housing HS can also exchange heat with the air Air. Thereby, the temperature rise in the cooling chamber 9 can be reduced, and as a result, the heat exchange efficiency between the cooling water CL flowing through the cooling chamber 9 and the oil OL inside the housing HS is improved. By improving the heat exchange efficiency, the size of the cooling chamber 9 can be reduced, which contributes to a reduction in dimensions of the entire housing HS.

A fan or the like may be provided so that the air Air in the vehicle room VR easily flows into the space SP.

As described above, the unit 1 according to the embodiment has the following configuration.

(1) The unit 1 includes the housing HS configured to accommodate the differential mechanism 5 (differential gear mechanism).

The housing HS includes the cooling path CP3 as a flow path through which the cooling water CL (coolant) flows.

When viewed in the radial direction of the rotation axis X (when viewed in radial direction), the cooling path CP3 has a portion overlapping the differential mechanism 5.

The cooling path CP3 has a portion that is positioned above the horizontal plane S passing through the rotation axis X coaxial with the axis of the drive shaft DB, which is the output shaft of the differential mechanism 5, and orthogonal to the vertical line VL direction (gravity direction).

With such a configuration, it is possible to improve the heat exchange efficiency between the housing HS and the cooling water CL, which is a coolant.

On the upper side of the horizontal plane S in the vicinity of the differential mechanism 5 in the unit 1, the layout is less constrained and there is a margin in space. Using this space, the cooling chamber 9 having the cooling path CP3 is disposed. As a result, a contact area between the housing HS and the cooling water CL flowing through the cooling path CP3 is increased, and the heat exchange efficiency between the cooling water CL and the housing HS is improved.

(2) The cooling path CP3 has a portion positioned below the horizontal plane S.

The cooling chamber 9 provided with the cooling path CP3 has a portion positioned below the horizontal plane S in addition to a portion positioned above the horizontal plane S. As a result, the contact area between the housing HS and the cooling water CL flowing through the cooling path CP3 is increased, and the heat exchange efficiency between the cooling water CL and the housing HS is improved.

(3, 4) When viewed in the rotation axis X direction (when viewed in axial direction), the cooling path CP3 has a portion overlapping the housing HS.

With such a configuration, the cooling path CP3 is less likely to protrude from the housing HS in the radial direction of the rotation axis X, which contributes to a reduction in dimension of the unit 1.

(5) When viewed in the rotation axis X direction (when viewed in axial direction), the cooling chamber 9 has a shape including an arc-shaped portion (main body portion 90) disposed to surround the rotation axis X which is an axis of the drive shaft DB which is an output shaft of the differential mechanism 5.

By forming the main body portion 90 of the cooling chamber 9 as an arc-shaped portion and joining the main body portion 90 to the inclined portion 141c so as to surround the rotation axis X, the cooling chamber 9 is prevented from greatly protruding from the unit 1 while maintaining a flow path area of the cooling path CP3, which contributes to a reduction in dimension of the unit 1.

(6) The housing HS includes, above the horizontal plane S, the inclined portion 141c (wall portion) having an outer surface in contact with the cooling water CL and an inner surface in contact with the oil OL.

The inclined portion 141c constitutes a part of the cooling path CP3 and is in contact with the cooling water CL on the outer surface thereof. The inner surface of the inclined portion 141c constitutes a wall surface of the catch tank 15 above the horizontal plane S and is in contact with the oil OL. Since heat is exchanged between the cooling water CL and the oil OL via the wall surface of the inclined portion 141c, the heat exchange efficiency is improved.

In the embodiment, although an example has been described in which the inclined portion 141c (wall portion) is configured as a part of the catch tank 15 to which the oil OL is supplied, the present invention is not limited thereto. In addition to the catch tank 15, a part of an oil passage through which the oil OL flows in the housing HS, a wall portion of the housing HS to which the oil OL guided by an oil guide is supplied, and the like can be used as the wall portion.

In an aspect of the present invention, the power transmission mechanism 3 includes, for example, a gear mechanism and an annular mechanism.

The gear mechanism includes, for example, a reduction gear mechanism, an acceleration gear mechanism, and a differential gear mechanism (differential mechanism).

The reduction gear mechanism and the acceleration gear mechanism include, for example, a planetary gear mechanism and a parallel gear mechanism.

The annular mechanism includes, for example, an endless annular component.

The endless annular component includes, for example, a chain sprocket, a belt, and a pulley.

The differential mechanism 5 is, for example, a bevel gear type differential gear, a planetary gear type differential gear.

The differential mechanism 5 includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

The unit 1 includes a gear that rotates integrally with the differential case.

For example, a final gear (differential ring gear) of the parallel gear mechanism rotates integrally with the differential case. For example, when a carrier of the planetary gear mechanism is connected to the differential case, a pinion gear rotates (revolves) integrally with the differential case.

For example, a reduction gear mechanism is connected downstream of the motor 2. A differential gear mechanism is connected downstream of the reduction gear mechanism. That is, a differential gear mechanism is connected downstream of the motor 2 via a reduction gear mechanism. An acceleration gear mechanism may be used instead of the reduction gear mechanism.

A single-pinion type planetary gear mechanism can use, for example, a sun gear as an input element, a ring gear as a fixed element, and a carrier as an output element.

A double-pinion type planetary gear mechanism can include, for example, a sun gear as an input element, a ring gear as an output element, and a carrier as a fixed element.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is a type that is not a stepped pinion gear.

In the present embodiment, although an example in which the unit 1 according to an aspect of the present invention is mounted on a vehicle has been described, the present invention is not limited to this aspect. The present invention can be applied to other than vehicles. When a plurality of examples and modifications are described in the present embodiment, these examples and modifications may be freely combined.

Although the embodiment of the present invention has been described above, the above embodiment is merely an application example of the present invention and is not intended to limit the technical scope of the present invention to the specific configuration of the above embodiment. The embodiment can be changed as appropriate within the scope of the technical idea of the invention.

The present application claims a priority based on Japanese Patent Application No. 2021-105241 filed with the Japan Patent Office on Jun. 24, 2021, all the contents of which are hereby incorporated by reference.

DESCRIPTION OF REFERENCE SIGNS

1 unit
2 motor
5 differential mechanism (differential gear mechanism)
14 gear case
141c inclined portion (wall portion)
9 cooling chamber
90 main body portion (arc-shaped portion)
HS housing
DA, DB drive shaft (output shaft)
X rotation axis (axis)
CL cooling water (coolant)
CP3 cooling path (flow path)
VL vertical line direction (gravity direction)
S horizontal plane

The invention claimed is:

1. A unit comprising:
a housing configured to accommodate a differential gear mechanism, wherein
the housing has a flow path through which a coolant flows,
the flow path has a portion that overlaps the differential gear mechanism when viewed in a radial direction, and
the flow path has a portion that is positioned above a horizontal plane passing through an axis of an output shaft of the differential gear mechanism and orthogonal to a gravity direction, and
the coolant is configured to flow above a wall portion which is positioned above the differential gear mechanism,
wherein the housing includes, above the horizontal plane, the wall portion having an outer surface in contact with the coolant and an inner surface in contact with oil.

2. The unit according to claim 1, wherein
the flow path has a portion that is positioned below the horizontal plane passing through the axis of the output shaft of the differential gear mechanism and orthogonal to the gravity direction.

3. The unit according to claim 1, wherein
the flow path has a portion that overlaps the housing when viewed in an axial direction.

4. The unit according to claim 2, wherein
the flow path has a portion that overlaps the housing when viewed in an axial direction.

5. The unit according to claim 1, wherein
when viewed in the axial direction, the flow path has a shape including an arc-shaped portion disposed so as to surround the axis of the output shaft of the differential gear mechanism.

6. The unit according to claim 1, wherein
the flow path is disposed adjacent to a catch tank which is positioned in the housing and provided on an upper portion of the housing.

7. The unit according to claim 1, wherein
in the flow path, an introduction portion and a discharge portion of the coolant are provided above the horizontal plane.

* * * * *